Aug. 29, 1961  W. J. FITZPATRICK ET AL  2,997,968
MIXING DEVICE
Filed July 15, 1957  2 Sheets-Sheet 1

INVENTORS:
William J. Fitzpatrick,
Elmer G. Magnus
and Dewey A. Manion,
BY Hair Freeman & Molinare
ATTORNEYS.

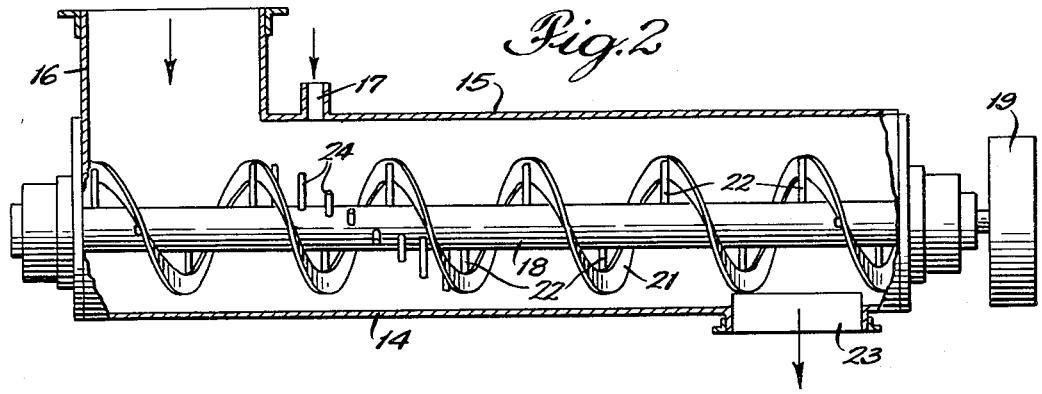
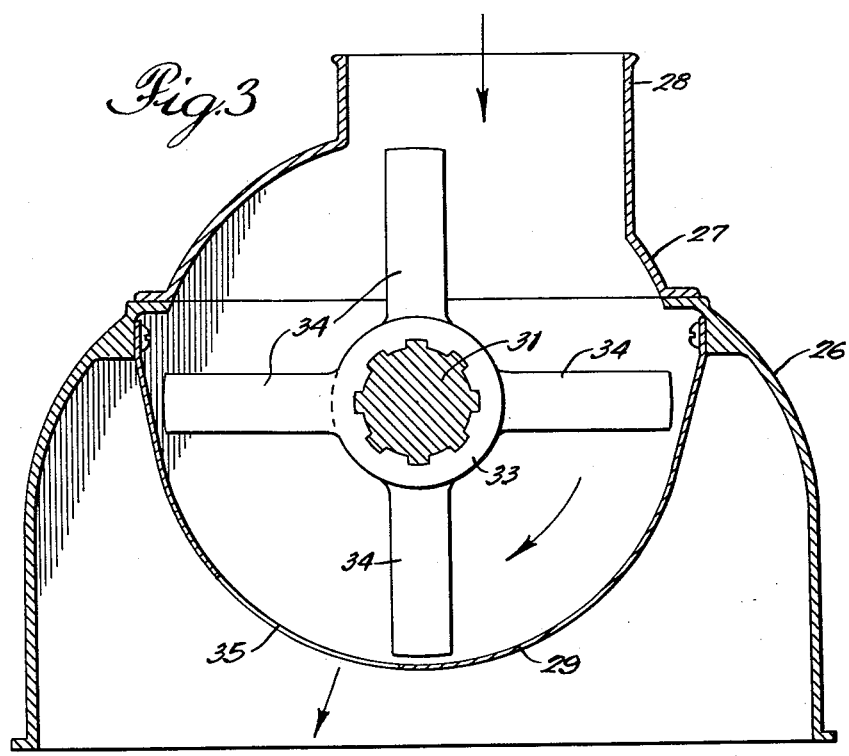
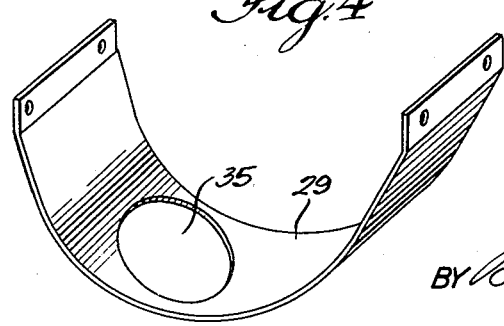

United States Patent Office 2,997,968
Patented Aug. 29, 1961

2,997,968
MIXING DEVICE
William J. Fitzpatrick, Elmer G. Magnus, and Dewey A. Manion, Chicago, Ill., assignors to The Fitzpatrick Company, a corporation of Illinois
Filed July 15, 1957, Ser. No. 672,054
4 Claims. (Cl. 107—14)

This invention relates to mixing devices and more particularly to an apparatus for mixing dry powder or granular material and liquids.

The uniform mixing of dry materials and liquids has always been a difficult problem and has generally been carried out in batches in various types of mixing devices. For example, the preparation of doughs such as cracker dough and the like has heretofore been a batch process being mixed or kneaded over a substantial period of time and then rolled out in the form of sheets for baking. Similarly, the preparation of various pharmaceuticals involving the mixing of dry materials and liquids has been carried out in batches and the mixed material has then been pressed into pills or otherwise formed into desired shapes.

It is one of the objects of the present invention to provide a mixing device in which uniform mixtures of dry materials and liquids are formed continuously and extremely rapidly.

Another object is to provide a mixing device in which a very rough mixture is first formed in a pre-mixer followed by intimate mixing to produce a product in the form of a uniform wet granule. In the case of doughs, the granules are subjected to further kneading and to pressure to form a dough, and the pressure may be utilized to extrude the dough into strips of the desired shape.

According to a feature of the invention, the pre-mixer is in the form of an elongated feed screw receiving dry material at one end and liquid at a point spaced from said end and including radially extending pins adjacent to the point of liquid supply to break up clumps of material which form when the liquid is added.

According to another feature, the intimate mixing is accomplished in a mixer having a rotor carrying spaced radial extending blades and having a single outlet in its bottom lying wholly posterior to a vertical plane through the axis of the rotor.

According to a still further feature, kneading means in the form of a feed screw having flights of progressively decreasing pitch toward the outlet end is provided to knead the material and to develop pressure thereon.

The above and other objects and features of the invention will be more readily apparent from the following description when read in connection with the accompanying drawing in which FIGURE 1 is an elevation of a complete mixing device embodying the invention with parts broken away and in section;

FIGURE 2 is a section through the pre-mixer;

FIGURE 3 is a section through the intimate mixer; and

FIGURE 4 is a perspective view of the closure plate for the intimate mixer.

Figure 1:
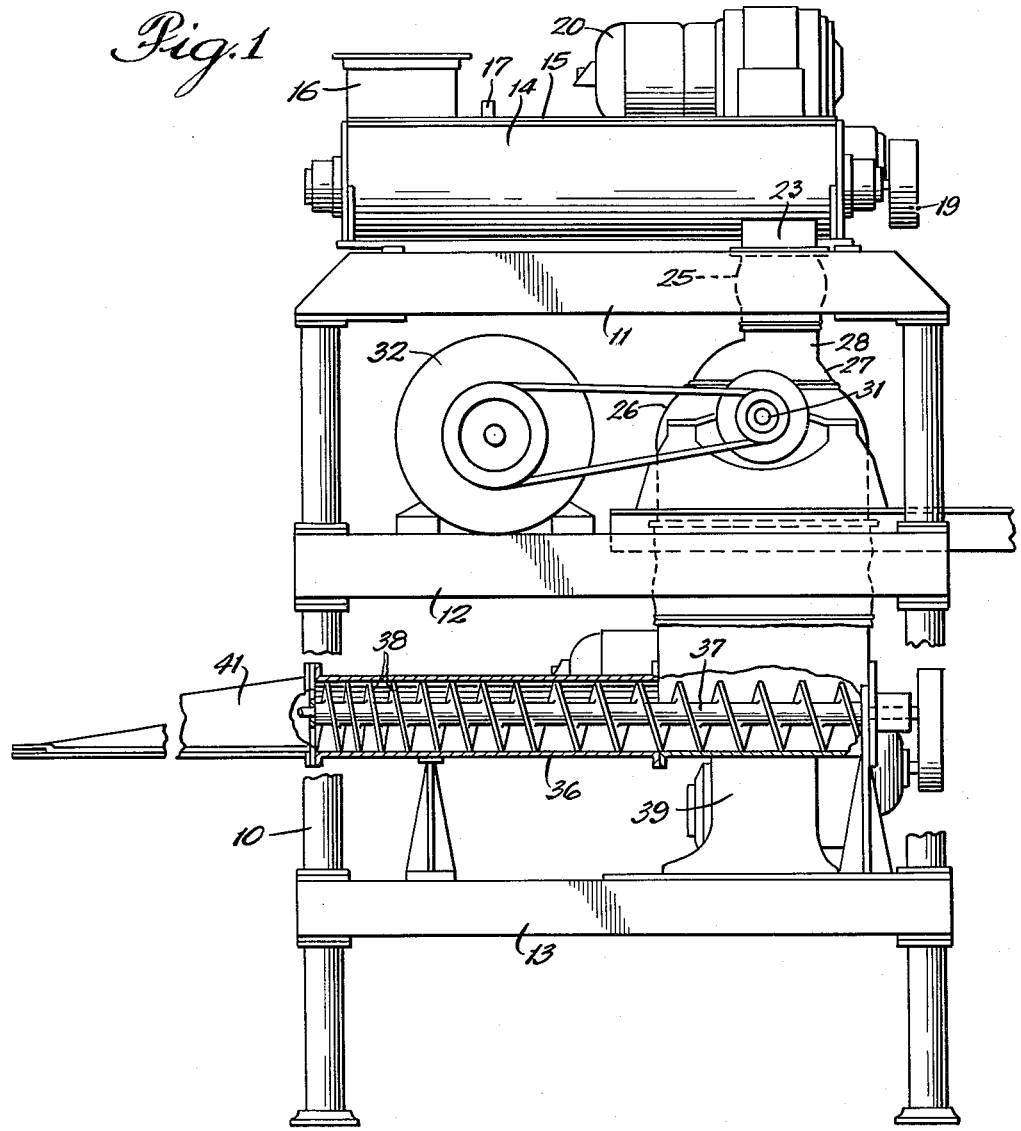

The complete machine as shown in FIGURE 1 is adapted to form dough such as cracker dough in a continuous process from the supplying of the raw materials to extrusion of the completely formed dough in condition for baking. The machine comprises a frame having vertical posts 10 on which cross supports 11, 12 and 13 are supported in vertically spaced relationship.

The upper cross support 11 carries a pre-mixing unit comprising a channel shaped casing 14 which is horizontally elongated and which is closed at its top by a removable cover 15 to facilitate cleaning. The cover is provided at one end with an inlet conduit 16 for dry material and with an inlet conduit 17 spaced from the inlet conduit 16 for liquid material.

As best seen in FIGURE 2 an elongated feed screw extends through the casing and is formed by a shaft 18 projecting beyond one end of the casing to carry a driving pulley 19 through which the screw may be driven by a motor 20. Suitable gear reducers may be used in connection with the motor to drive the shaft 18 at a desired speed on the order of 100 to 200 r.p.m. The shaft 18 carries a spiral strip 21 which is in the form of a flat helix having a central opening larger than the diameter of the shaft. The strip 21 is secured to the shaft in spaced relation thereto by supporting pins 22 to define an open feed screw through which the material can pass. The feed screw extends the full length of the casing so that dry material fed into the inlet conduit 16 will be received by the screw and advanced from left to right thereby, as seen in FIGURE 2 to be discharged through an outlet conduit 23.

Opposite the liquid inlet conduit 17 the shaft 18 carries a series of axially and circumferentially spaced pins 24 which project radially from the shaft and which preferably extend as shown from a point between the inlet conduits 16 and 17 to a point beyond the inlet conduit 17 in the direction of feed of the material.

In the use of the pre-mixing device as so far described, the dry powdered or granule materials to be employed in the product are fed into the inlet conduit 16 and will be advanced through the casing 14 by the screw. The action of the screw on the dry materials before liquid is added thereto tends to mix the dry materials thoroughly and to fluff them slightly in preparation for receiving the liquid. When the liquid is added through the inlet conduit 17, it will first mix very roughly with the dry material and will tend to form relatively large clumps. The pins 24 will break up these clumps and the action of the screw itself will tend to break them up still further so that by the time the material reaches the outlet conduit 23 it is in the form of relative uniform lumps or clusters which are too large to be useable but are relatively uniformly mixed.

From the outlet conduit 23 the lumps of material pass through a conduit 25 into a fine mixer which is best shown in FIGURES 3 and 4. This unit is in the form of a comminuting machine as more particular described and claimed in the patent to Magnus 2,348,916. As shown, this machine comprises a base 26 supported on the intermediate shelf 12 over an opening therein and open at its top. The top is closed by a cover 27 detachably secured to the base and formed with an inlet nipple 28 to which the conduit 25 may be secured. The cover is generally cylindrical on its interior and the base carries a closure plate 29 also of generally cylindrical form and forming a continuation of the cylindrical cover surface.

The base carries a shaft 31 which is co-axial with the cylindrical surfaces and which is driven at relative high speed on the order of several thousand r.p.m. by a motor 32. The shaft carries a hub 33 splined thereto and having projecting therefrom at axially and circumferentially spaced points a plurality of narrow rigid blades 34.

According to an important feature of the invention, the material after being thoroughly mixed by operation of the blades 34 is discharged through an opening in the lower cover plate 29. We have found that for proper operation, the cover plate 29 should be provided with a single discharge opening as illustrated at 35 and which is positioned wholly posterior to a vertical plane through the axis of the shaft 31 with respect to the direction of rotation of the tips of the blades 34. The size of the opening 35 may be varied slightly according to the type of product involved and the amount of mixing required but will generally be a single relative large opening and for satisfactory results must always lie completely posterior to a vertical plane through the shaft axis.

In use, the lumpy material formed in the pre-mixer is discharged into the inlet nipple 28 and will drop down into the casing formed by the cover 27 and plate 29 to be struck by the blades 34 and broken up into relatively small uniform granules. Not only do the blades break up the clumps, but because the material is suspended in the casing and is struck at high velocity by the blades, it will be thoroughly mixed as well as being reduced in size. The material as discharged through the opening 35 is in the form of granules which may be more or less wet, depending upon the relative proportions of dry material and liquids. For many types of pharmaceuticals the granules may be used directly either in granule form or for pressing into pills or the like. For doughs such as cracker dough, however, additional kneading and working is required.

Therefore, in the formation of doughs, the material discharged from the fine mixer through the opening 35 is led into a kneading and pressure unit supported on the lower shelf 13. This unit as shown comprises a cylindrical housing 36 supported horizontally on the frame and containing a feed screw 37 extending therethrough. The feed screw as shown is provided with relatively coarse flights of large axial pitch toward the right end at which the material is received and toward the left or discharge end the flights progressively narrow to provide narrow flights 38 of short axial pitch toward the discharge end. The screw may be driven by a motor 39 through a suitable speed reducer and belting to operate at a relative low speed on the order of 100 r.p.m.

The wet granular material received by the screw is advanced thereby from right to left through the casing 36 and action of the screw on the material tends to knead it so that it will be formed into a smooth dough. The reduced flights toward the discharge end of the screw effect additional working of the dough and further build up substantial pressure thereon which is helpful in forming a smooth dough and which may be utilized to press the dough through an extruder 41. The extruder in the case of articles like crackers may terminate in a wide flat outlet opening through which the dough will be pressed in a sheet in condition for baking after having suitable division markings and insignia rolled or stamped therein. Where extrusion into a sheet is not required, a round extruder of reduced size may be connected to the casing 36 simply to create back pressure on the material so that it will be subjected to the pressure developed by the reduced flights on the screw for the desired working and compression effect.

It will be seen that by the present invention materials of various different types involving mixtures of liquids and dry powdered or granule material may be formed very rapidly in a continuous process and that an extremely uniform mixture will result.

While the invention has been particularly described in connection with one specific embodiment and in connection with the mixing of pharmaceuticals and doughs, it will be understood that the invention may be applied in many other purposes and that the particular embodiment shown may be varied. It is, therefore, not intended that the scope of the invention be limited to the precise products described or the precise machine illustrated nor otherwise than by the terms of the appended claims.

What is claimed is:

1. A mixing device comprising an elongated cylindrical casing having an inlet at one end and an outlet at its other end, an elongated feed screw in the casing, means to supply dry material to the inlet end of the casing, means to supply liquid to the casing downstream from its inlet end, a fine mixer including a generally cylindrical horizontal casing receiving the mixed dry material and liquid from the first named casing, a rotor coaxial with the last named casing and including a plurality of radially extending spaced blades, means to drive the rotor, and an arcuate closure plate carried by the last named casing and defining a closure for the bottom thereof and formed with a single discharge aperture therein, said aperture being wholly located in the first quadrant of the closure plate that the blade traverses after passing through the lowermost portion of a vertical plane through the rotor axis.

2. The mixing device of claim 1 including an elongated feed screw receiving mixed material discharged through the aperture at one end and having flights decreasing in pitch toward its other end to knead and compress the material and an extruder receiving the compressed material from said other end of the last named feed screw and discharging the material in the form of a continuous strip.

3. A mixing device comprising an elongated cylindrical casing having an inlet at one end and an outlet at its other end, an elongated feed screw in the casing including a shaft and a helical strip secured to the shaft in spaced relation thereto, means to supply dry material to the inlet end of the casing, means to supply liquid to the casing downstream from its inlet end, a plurality of spaced pins extending radially from the shaft adjacent to the liquid supply means, a horizontal generally cylindrical casing receiving material from the first named casing, a rotor in the last named casing coaxial therewith, a plurality of spaced radially extending blades on the rotor, the last named casing including an arcuate bottom closure formed with a single discharge aperture therethrough, said aperture being wholly located in the first quadrant of the closure plate that a blade traverses after passing through the lowermost portion of a vertical plane through the rotor axis, and means to drive the rotor.

4. In a mixing device, a mixing unit comprising a generally cylindrical casing with its axis horizontal and formed with an inlet opening in its upper part, a rotor extending axially through the casing and including a plurality of spaced radially extending blades, means to drive the rotor, and an arcuate bottom closure for the casing formed with a single discharge opening therethrough, said opening being wholly located in the first quadrant of the arcuate bottom closure that a blade traverses after passing through the lowermost portion on a vertical plane through the rotor axis.

References Cited in the file of this patent

UNITED STATES PATENTS

| | | |
|---|---|---|
| 540,963 | Duhrkop | June 11, 1895 |
| 1,419,397 | Marsh | June 13, 1922 |
| 2,032,201 | Davis et al. | Feb. 25, 1936 |
| 2,348,916 | Magnus | May 16, 1944 |
| 2,385,767 | Wagner | Sept. 25, 1945 |
| 2,524,999 | Schulerud | Oct. 10, 1950 |
| 2,543,198 | Plunguian | Feb. 27, 1951 |
| 2,626,856 | Alles | Jan. 27, 1953 |
| 2,640,033 | Marshall | May 26, 1953 |
| 2,646,260 | Bates | July 21, 1953 |
| 2,693,915 | Kovac | Nov. 9, 1954 |
| 2,764,361 | Moore | Sept. 25, 1956 |
| 2,868,143 | Strahmann | Jan. 13, 1959 |